United States Patent [19]
Bayless et al.

[11] Patent Number: 5,509,068
[45] Date of Patent: Apr. 16, 1996

[54] ELECTRONIC RING MONITORING DEVICE FOR TELECOMMUNICATIONS LINE

[76] Inventors: Samuel R. Bayless, P.O. Box 331 FM-RD 2624, Maud, Tex. 75567; Michael R. Bayless, 3303 Santana, Porter, Tex. 77365

[21] Appl. No.: 218,503

[22] Filed: Mar. 25, 1994

[51] Int. Cl.$^6$ .................................................. H04M 1/26
[52] U.S. Cl. ..................... 379/376; 379/377; 379/373; 379/418
[58] Field of Search ................................. 379/376, 377, 379/373, 418, 90, 102

[56] References Cited

U.S. PATENT DOCUMENTS

| | | | |
|---|---|---|---|
| 2,095,681 | 10/1937 | Squire et al. | 379/373 |
| 2,572,815 | 10/1951 | Laporte | 379/373 |
| 2,960,576 | 11/1960 | Kath | 379/373 |
| 3,783,193 | 1/1974 | Lee | 379/373 |
| 4,076,968 | 2/1978 | Wattenbarger | 379/373 |
| 4,379,210 | 4/1983 | Sparber | 379/373 |
| 4,384,171 | 5/1983 | Klee | 379/373 |
| 4,467,144 | 8/1984 | Wilkerson et al. | 379/373 |
| 4,747,133 | 5/1988 | Valenzona et al. | 379/376 |
| 4,771,403 | 9/1988 | Maskovyak et al. | 364/900 |
| 5,157,721 | 10/1992 | Lee | 379/376 |
| 5,283,441 | 2/1994 | Fabian | 250/551 |

OTHER PUBLICATIONS

Sprint/North Supply, Telephones and Accessories Catalog, 1993, pp. 122–124 and 129.

*Primary Examiner*—Jeffery Hofsass
*Assistant Examiner*—Jacques M. Saint-Surin
*Attorney, Agent, or Firm*—Arnold, White & Durkee

[57] ABSTRACT

An electronic ring monitoring device is disclosed that includes telecommunications interface circuitry, ring detection circuitry, isolation circuitry, and output driver circuitry. The telecommunications interface circuitry may include a switch allowing programmable selection of alternate connections to the telecommunications source depending upon the particular source involved. The ring detection circuitry may include a bridge rectifier, a filtering capacitor, a bleeder resistor to prevent false detection from stray voltages on the telecommunications line, and a variable resistor to allow a programmable detection level. The isolation circuitry may include a optical isolator that will electronically isolate the telecommunications side of the device from the output side of the device. The driver circuitry may include a triac that allows current flow when a ring is indicated and may include inductive load protection circuitry.

17 Claims, 4 Drawing Sheets

Residential Installation

ELECTRONIC RING MONITORING DEVICE FOR TELECOMMUNICATIONS LINE

BACKGROUND OF THE INVENTION

The present invention relates to electronic ring monitoring devices that activate AC operated signalling devices in response to a ringing signal detected on a telecommunications line. In particular, the present invention relates to an electronic device that monitors the lines from a telephone company or a PBX system and that provides a switched AC output for driving an attached load.

There are a number of different types of telephone systems in use today. Standard copper pair systems utilize a pair of wires, designated "tip" and "ring," connected from the central office (where the routing switches are located) to the subscriber's telephone. In this type of system, a 48 vdc battery voltage is applied between tip and ring, and a 110–130 volt pulsed DC ring signal is applied when necessary to operate the subscriber's ringer. The ring signal typically has a frequency of 20–60 cycles per second. If the subscriber is located within 3 to 4 miles of the central office (known as a "short loop"), there is usually plenty of power in the ring signal to operate a number of telephone ringers or other devices, such as those described in the references cited herein. If the subscriber is located farther away, such as more than 5 or 6 miles from the central office, the power available in the ring signal is substantially reduced, and the addition of loads such as additional telephones or other devices can cause the system to malfunction.

A PBX (private branch exchange) or "key" telephone system is connected to one or more incoming telephone lines (such as copper pair), and it contains switches for connecting a number of extension lines to those incoming lines. The ring signal that is applied to the extension lines by a PBX system ranges from 10–100 volts and 20–30 cycles per second. Because of the typically lower ring voltage used in PBX systems, the power available to run accessories that use the ring signal is substantially lower than on a copper pair system. Consequently, some accessories that are designed to operate on a copper pair system will not function reliably on a PBX system.

A number of types of "carrier" systems are also in use, which are characterized by the use of multiplexing and demultiplexing circuits to place more than one voice channel on a single pair of wires. Both analog and digital multiplexing techniques are used in carrier systems. The ring signals used in carrier systems are at very low power levels compared to those in standard copper pair systems, and the telephones and other equipment used in carrier systems are high impedance, low power devices.

It is desirable to provide a single ringer module that will switch a 120 volt AC load in response to the occurrence of a ring signal on any of the above mentioned types of telephone systems, despite the variations in ring voltage and available ring power on the systems.

There are existing devices that monitor telephone lines and turn on attached visual or audible devices when a ring signal is detected. For example, U.S. Pat. No. 5,157,721 provide a control circuit which detects if the telephone receiver is lifted from the cradle or if the telephone ringer is actuated, and provides a switched power source and response thereto. U.S. Pat. No. 4,747,133 discloses a circuit for operating an electrical light in response to a ring signal or an off-hook condition. U.S. Pat. No. 4,379,210 discloses a ring signal detection circuit that operates an incandescent lamp when ring signal is detected on the telephone line. U.S. Pat. No. 4,467,144 discloses an apparatus for activating a remotely located device under the control of a telephone ring signal, having a relatively sophisticated signal detector and discriminator circuit for deriving ringing signal frequency information and discriminating against dial pulses.

These existing devices have many disadvantages. Such devices are generally reliable in operation only when connected to a standard copper pair telecommunication circuit. Few existing devices, for example, may be connected to PBX systems. Furthermore, existing devices are generally not suitable for driving inductive loads, and they often utilize solid state or mechanical switches without providing adequate isolation between the power switching circuitry and the telecommunications circuitry. Many existing devices are obsolete because of the rapid advances in the technology utilized by the telecommunications industry. Also, known existing devices do not provide the versatility to operate a wide variety of loads from most common types of phone systems.

The telecommunications industry has a need for a device that will overcome these disadvantages. In particular, a device is needed that will work reliably when connected to many different types of telecommunication circuits and that will operate both resistive and inductive loads. The device should be able to discern between a true ringing signal and various types of false signals, and it should be useful in an industrial as well as a residential environment. Further, the device should provide isolation between the telecommunication circuitry and the load driving circuity.

SUMMARY OF THE INVENTION

The deficiencies in the prior art discussed above are addressed by the device and method of the present invention. The preferred embodiment of present invention provides a device that reliably determines when a ringing condition exists on a telecommunication line and reliably activates an AC operated device of the user's choice (either inductive or resistive). The present invention may be used in residential and industrial environments. The present invention may be used by the hearing impaired, in a loud industrial plant, or anywhere else where extra visual or audio signaling corresponding to a telephone ring signal is desired or required. The present invention accomplishes these objectives with a device that is surprisingly simple in design and operation. The present invention does not utilize a mechanical switch and it isolates the load-driving circuitry from the telecommunications line.

An electronic ring monitoring device according to the present invention includes telecommunications interface circuitry, ring detection circuitry, isolation circuitry, and output driver circuitry. The telecommunications interface circuitry may include a switch allowing programmable selection of alternate connections to the telecommunications source depending upon the particular type of telephone system involved. The ring detection circuitry may include a bridge rectifier, a filtering capacitor, a bleeder resistor to prevent false detection from stray voltages or pulses on the telecommunications line, and a variable resistor to allow a programmable detection level. The isolation circuitry may include an optical isolator that will electrically isolate the telecommunications and ring detection circuits from the output circuits. The driver circuitry may include a triac driver that allows current flow when a ring is indicated and that may include inductive load protection circuitry.

The advantages of the present invention will be further appreciated from the drawings and from the detailed description provided below.

BRIEF DESCRIPTION OF THE DRAWINGS

The herein described advantages and features of the present invention, as well as others which will become apparent, are attained and can be understood in more detail by reference to the following description and appended drawings, which form a part of this specification.

It is to be noted, however, that the appended drawings illustrate only exemplary embodiments of the invention and are therefore not to be considered limiting of its scope, for the invention may admit to other equally effective embodiments.

DETAILED DESCRIPTION OF THE PREFERRED EMBODIMENTS

Figure 1:
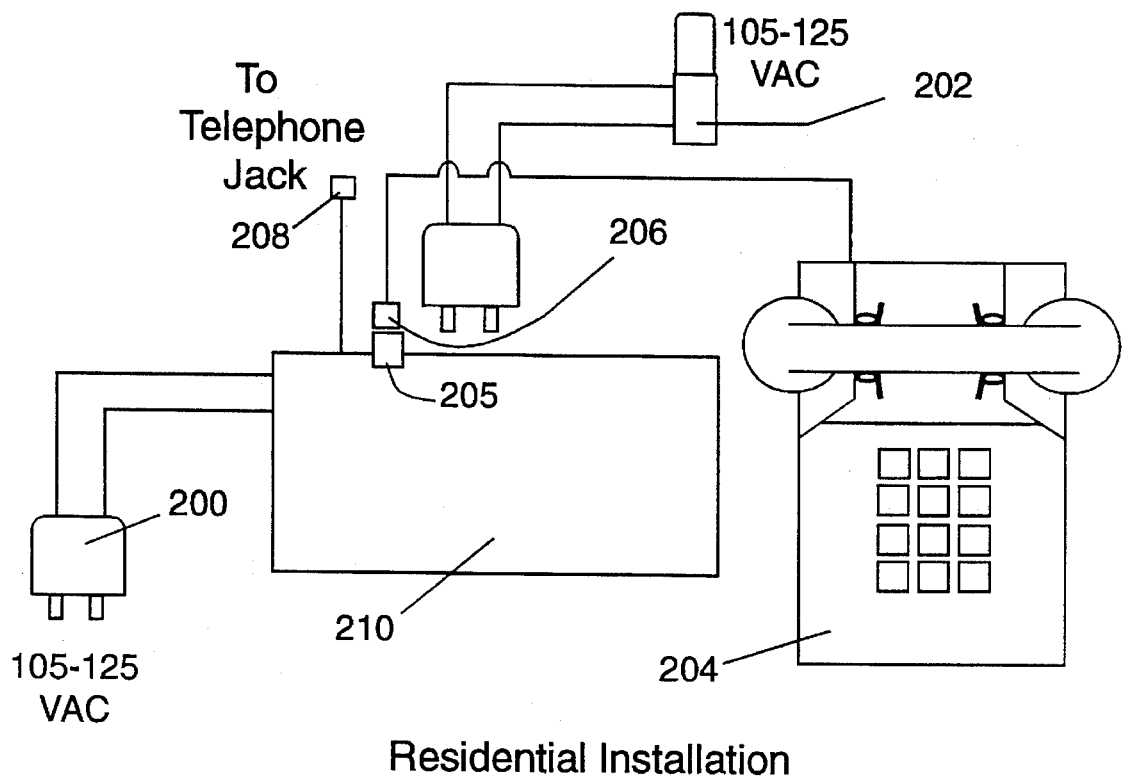
FIG. 1 illustrates an embodiment of the present invention in a residential installation environment.

Turning now to the drawings, FIG. 1 shows an embodiment of the present invention in a residential installation environment. Telephone jack 208 connects device 210 according to the present invention to a telephone communication line. An additional telephone 204 may be connected to device 210 by way of a modular phone jack 205 incorporated into device 210 and connectable to telephone jack 208. Plug 200 may connect device 210 to an AC power source, for example 105–125 volts AC. Signalling device 202 may be connected to device 210 and driven by the AC power output produced by device 210, for example 105–125 volts AC. Signaling device 202 may be of any configuration of the user's choice (e.g., an inductive or resistive load).

In preferred embodiments, device 210 is provided with a standard 2-prong or 3-prong electrical outlet that signalling device 202 may be plugged into. Thus, signalling device 202 may comprise an electric light or any other device having a standard electrical plug that can be inserted into the outlet in device 210.

In alternative embodiments, device 210 may be battery operated, and signalling device 202 may also be battery operated. In such an embodiment, no connection to an alternating current power source is necessary and the signalling device incorporating the inventions described and claimed in this application only needs to be connected to the telephone line. Modifications would be made to the circuitry illustrated in FIG. 4 in a battery operated embodiment. For example, the triac TR1 would be replaced by a suitable DC switching device, such as a diac, and the values of components such as R3, C4 and R5 could be changed accordingly.

Figure 2:
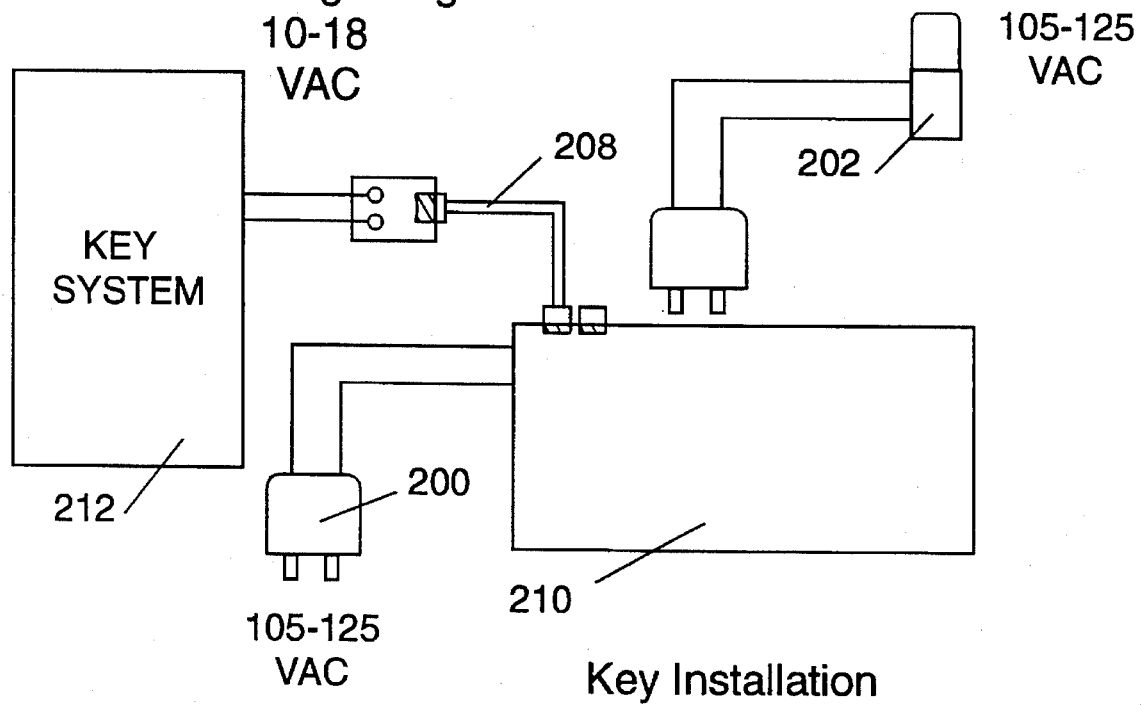
FIG. 2 illustrates an embodiment of the present invention in a Key System installation environment.

FIG. 2 shows an embodiment of the present invention in a PBX or key system installation environment. The configuration in FIG. 2 is similar to that in FIG. 1 except that device 210 is connected to a PBX or key system 212 instead of directly to phone company equipment.

Figure 3:
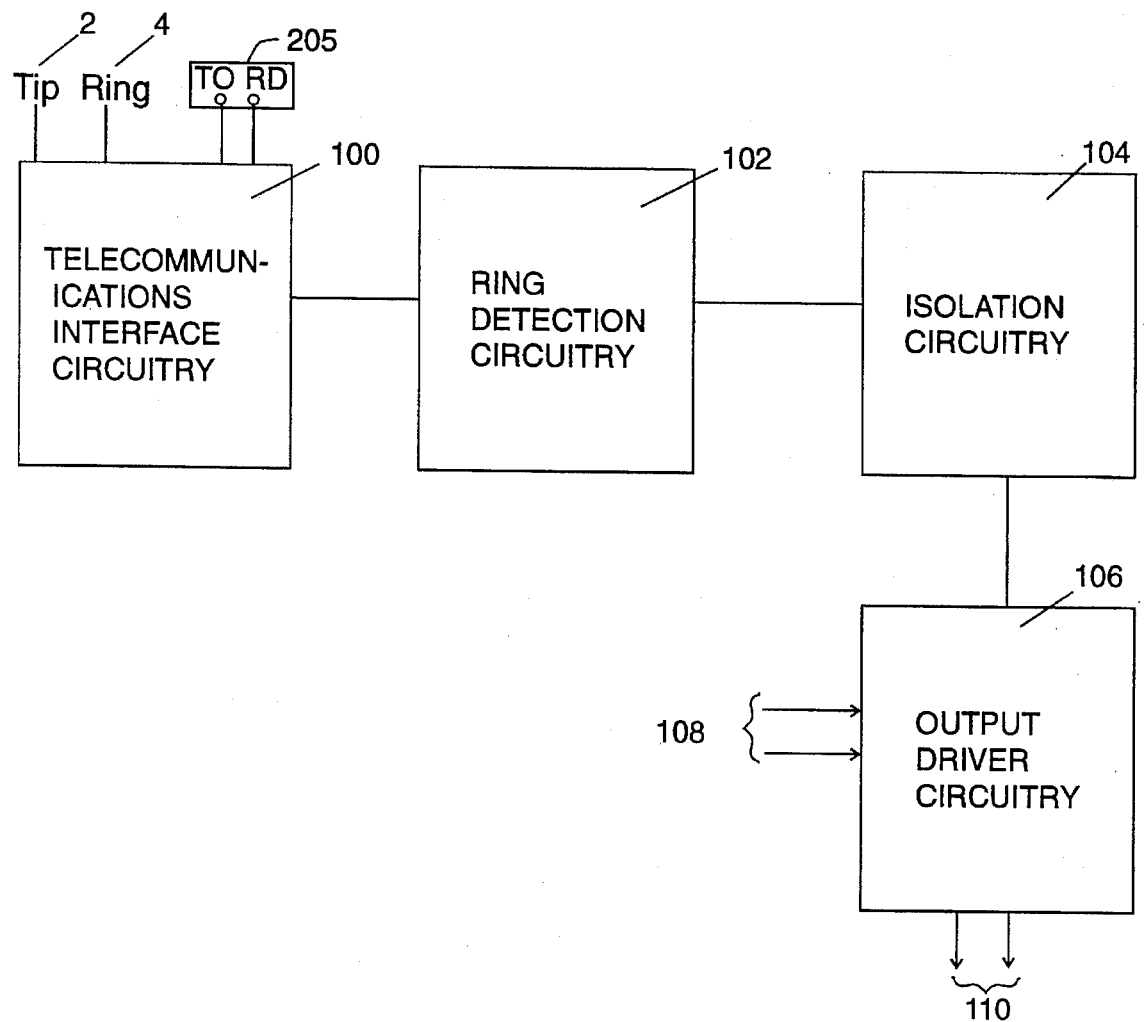
FIG. 3 is a block diagram of the four stages of the present invention.

FIG. 3 is a block diagram of the present invention. The present invention includes four stages: telecommunications interface circuitry 100, ring detection circuitry 102, isolation circuitry 104, and output driver circuitry 106. Telecommunications interface circuitry 100 includes an input for tip line 2 and ring line 4 that may be connected to a telecommunications source. The signal from the telephone company or other source is received by telecommunications interface circuitry 100. Telecommunications interface circuitry 100 passes the signal to ring detection circuitry 102, where the signal is rectified and filtered. Ring detection circuitry 102 determines whether a ring signal is actually present and indicates a positive ring result to isolation circuitry 104. Isolation circuitry 104 electronically isolates telecommunication interface circuitry 100, and ring indication circuitry 102 from output driver circuitry 106 and passes the ring indication to output drive circuitry 106. Output driver circuitry 106 takes the ring indication and provides a switched current path from an AC power source input 108 to the signalling device output 110. Output driver 106 includes protective circuitry to handle voltage surges that may be produced by an inductive load.

Figure 4:
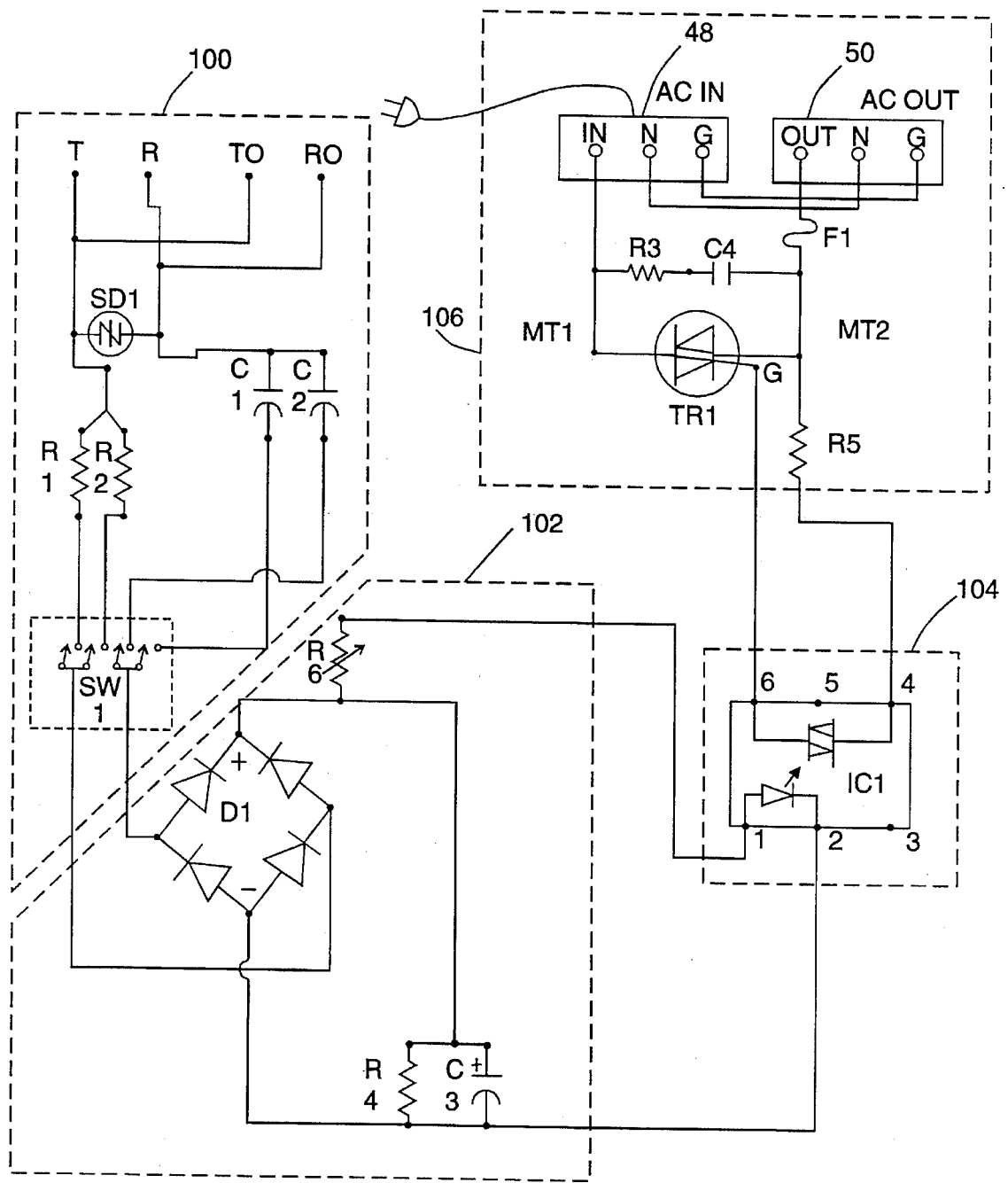
FIG. 4 is a schematic diagram of an embodiment of the present invention.

FIG. 4 is a schematic diagram of a presently preferred embodiment of the present invention that implements the circuitry shown in FIG. 3. The connection point to the telephone line is through tip line T and ring line R. Possible ring signal sources include telecommunications lines such as solid copper pairs (short loops and long loops); analog and digital carriers; and PBX or key systems (analog and digital); and analog and digital pair gain devices. This connection may be implemented in the form of a modular connection with an RJ 11 modular jack. Sidactor (SD1) 6 is connected to tip line T and ring line R. Sidactor 6 provides voltage transient and surge protection. Tip line T is connected to switch SW1 through resistor R1 and resistor R2. Ring line R is connected to switch SW1 through capacitor C1 and capacitor C2. Switch SW1 allows selection between the two RC circuit paths. Capacitors C1 and C2 act to block the typical 48 volt DC signal (battery) in the telephone company line. Capacitors C1 and C2 also prevent DC current flow across tip line T and ring line R, so that the present invention, will not place a load on the telephone company line during the idle state. A modular jack 205 or other suitable connector may be provided for connecting a telephone to the present invention. The connections to such a connector are shown as tip T0 and ring R0, which are connected to the incoming tip and ring lines.

When a ring signal is applied between tip line T and ring line R of the present invention, the ring voltage is passed to the AC inputs of bridge rectifier D1, through resistor R1 and capacitor C1, or through resistor R2 and capacitor C2. The path depends upon the setting of switch SW1. Switch SW1 allows for programmable selection between high and low voltage signaling. For example, resistor R1 and capacitor C1 may be chosen to accommodate a ring voltage of above 60 volts (e.g., standard telephone line), and resistor R2 and capacitor C2 may be chosen to accommodate a ring voltage of less than 60 volts (e.g., PBX system). Capacitors C1 and C2 may be selected to be non-electrolytic in order to provide low loading effect on the telephone line. Resistor R1 and capacitor C1, or resistor R2 and capacitor C2, may be selected to form a circuit that is resonant in the range of the 20 to 60 cycle ringing frequencies commonly used by the telephone communications industry.

Bridge rectifier D1 rectifies the AC or pulsed ring signal. Resistor R4 and capacitor C3 are placed between the positive and negative terminals of bridge rectifier D1. Capacitor C3 filters the DC voltage produced at the terminals of bridge rectifier D1. Resistor R4 acts to prevent any false trigger of triac optical-isolator IC1 by bleeding off any stray DC voltage and, thereby, to prevent false triggering due to dial pulses or other stray voltage on the telephone line. In other words, capacitor C3 is charged by current from rectifier D1, while resistor R4 is bleeding off the charge on capacitor C3. If the average current from rectifier D1 is below a threshold value resistor R4 will prevent capacitor C3 from charging sufficiently to activate optical isolator IC1. If the average current from rectifier D1 is above the threshold value, capacitor C3 will charge and sufficient voltage will develop across C3 to activate optical isolator IC1.

The positive terminal of bridge rectifier 18 is connected to pin 1 of optical isolator IC1 through variable resistor R6. Variable resistor R6 allows adjustment of the threshold operational voltage for optical isolator IC1. Pin 2 of optical isolator IC1 is connected to the negative terminal of bridge rectifier D1.

Optical isolator IC1 is activated when sufficient current flows from pin 1 to pin 2 to illuminate the LED contained in optical isolator IC1. The amount of current that is introduced at pin 1 is determined by the voltage across capacitor C3 and the resistance of variable resistor R6.

At pins 4 and 6 optical isolator IC1 provides an operating voltage that switches triac TR1. Pin 4 of optical-isolator IC1 is connected to gate (G) of triac TR1. Triac TR1 controls the flow of AC current between the AC power input (AC IN) and the AC power output terminal (AC OUT) 50. Pin 6 of the optical isolator IC1 is connected to output side MT2 of triac TR1 through resistor R5. During operation current flows through resistor R5 and biases triac TR1, switching triac TR1 to a conducting state and allowing the flow of AC current that in turn provides AC current to the AC power output terminal and thereby energizes the signaling device. Possible signalling devices may include a strobe light, a table lamp, a bell, a horn, a motor, or other remote controlled devices.

In the preferred embodiment, AC input power may be provided by a 120 volt AC source that may include a hot line, a neutral line, and a ground line. AC input power is connected to AC input power terminal (AC In) 48. The neutral and ground lines are directly connected from the AC input terminals to the AC output terminals. The hot line of input terminal 48 is connected to input side (MT1) 43 of triac TR1. The hot line of output terminal 50 is connected to output side 41 of triac TR1 through resistor R3 and capacitor C4. In response to a power surge, triac TR1 may tend to latch in a conductive state. Resistor R3 and capacitor C4 prevent such undesirable latching by acting to absorb enough induced voltage from an inductive load (when switched off) to prevent triac TR1 from becoming permanently conductive. Output side 41 of triac TR1 is the switched side of triac TR1. The AC output power terminal 50 is connected to output side 41 of triac TR1 through fuse F1. An inductive or resistive load may be connected to AC power output terminal 50 which may be a standard 3-prong electrical outlet.

The operation of a preferred embodiment of this present invention may be described as follows. Referring to FIG. 4, terminals T & R of the telecommunications interface circuitry are connected to the tip and ring of the incoming telephone line, typically through a modular connector. Sidactor (SD1) provides surge protection to those lines and to the device of the present invention. The tip connection is connected to bridge rectifier D1 through one of R1 or R2 as is selected by switch (SW1). The ring connection is also connected to rectifier circuit D1 through capacitor C1 or capacitor C2, as selected by switch (SW1). When a ring voltage signal is present between the tip and ring conductors in the telephone circuit, a rectified DC signal is produced at the positive (+) and negative (−) terminals of rectifier D1. That rectifier voltage charges capacitor C3 until a sufficient voltage is built up across C3 to provide adequate current through resistor R6 to activate optical isolator IC1. Resistor R6 may be varied by the user to control the sensitivity of the ringer module. Resistor R4 is connected in parallel with capacitor C3 in order to bleed off stray voltage. The combination of resistor R4 and capacitor C3 performs a ring signal detection and discrimination function. If insufficient current is provided from rectifier D1, capacitor C3 will not be able to charge due to the bleed off of charge through resistor R4. This would be the case where the voltage across the tip and ring was caused by dialing signals or stray voltage, as opposed to a true ring signal. When optical isolator IC1 is activated, the output side of optical isolator IC1 provides an operational voltage to the gate G of triac TR1, which in turn causes triac TR1 to enter a conductive mode such that current can flow freely between terminals MT1 and MT2. The incoming AC hot wire is connected to triac terminal MT1, and the outgoing AC hot wire is connected to triac terminal MT2 through fuse F1. Thus, when optical-isolator IC1 is activated, current can flow from the AC input terminal through the triac, through the fuse and to the AC output terminal. Only the hot wire is switched, and the neutral and ground wires of the AC load circuit are connected directly from the AC source to the AC load. The series combination of resistor R3 and capacitor C4 provide surge protection to triac TR1 in the event that an inductive load is connected to the AC output terminals of this invention.

The following table provides representative values for the components in a preferred embodiment of the present invention as described above.

| | |
|---|---|
| Sidactor SD1 | Sidactor 215 V |
| Resistor R1 | 100 OHM ½ W |
| Resistor R2 | 5.1 K ½ W |
| Resistor R3 | 100 OHM ½ W |
| Resistor R4 | 2.2 K ½ W |
| Resistor R5 | 180 OHM ½ W |
| Resistor R6 | 3 K Variable ⅛ W |
| Capacitor C1 | 2.2 uf 250 V |
| Capacitor C2 | 4.7 uf NP Electrolytic 100 V |
| Capacitor C3 | 100 uf Electrolytic 35 V |
| Capacitor C4 | .01 uf Disc 500 V |
| Bridge Rectifier (D1) | Bridge Rectifier 1.5A 200 V |
| Triac Optical-isolator (IC1) | Optical-isolator MCP3010 |
| Triac Driver (TR1) | Triac 6A 400 V |
| Switch (SW1) | 4 Position Dip |
| Fuse (F1) | Fuse 5A 120/250VAC |

Further modifications and alternative embodiments of this invention will be apparent to those skilled in the art in view of this description. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the shape, size, and arrangement of parts. For example, equivalent elements or materials may be substituted for those illustrated and described herein, and certain features of the invention may be utilized independently of the use of other features, all as would be apparent to one skilled in the art after having the benefit of this description of the invention.

We claim:

1. An apparatus for operating an electrical load in response to a telephone ring signal, comprising:

a telecommunication interface circuit, comprising:
   a first resistor-capacitor combination for use in a telephone system providing a ring signal having a first voltage level;
   a second resistor-capacitor combination for use in a telephone system providing a ring signal having a second voltage level; and
   a switch for selecting between the first resistor-capacitor combination and the second resistor-capacitor combination depending on the voltage level of the ring signal;
a ring detection circuit;
an output circuit; and
an isolation circuit coupled between the ring detection circuit and the output circuit.

2. The apparatus of claim 1, wherein the telecommunication interface circuit comprises a surge protector.

3. The apparatus of claim 1, wherein the ring detection circuit comprises:
   a rectifier circuit having two input nodes and two output nodes;
   a detector capacitor connected to the output nodes of the rectifier circuit; and
   a detector resistor connected in parallel to the detector capacitor.

4. The apparatus of claim 3, further comprising a variable resistor connected to an output node of the rectifier circuit and to the isolation circuit.

5. The apparatus of claim 1, wherein the isolation circuit comprises an optical isolator.

6. The apparatus of claim 5, wherein the output circuit comprises an input terminal, an output terminal, and a triac connected between the input terminal and the output terminal.

7. The apparatus of claim 6, further comprising a surge resistor and a surge capacitor connected in series between the input terminal and the output terminal.

8. The apparatus of claim 6, wherein the triac has a gate terminal that is connected to an output of the isolation circuit.

9. An apparatus for operating an electrical circuit in response to a telephone ring signal, comprising:
   telecommunication circuit interface means for connecting the apparatus to a telecommunication circuit;
   detection means for detecting a ring signal on the telecommunication circuit;
   an output circuit including:
      a power input terminal;
      a power output terminal;
      a triac connected between the power input terminal and the power output terminal; and
      a surge resistor and a surge capacitor connected in series between the power input terminal and the power output terminal; and
   means for electrically isolating the detection means from the triac;
   wherein the triac has a gate terminal that is connected to the isolation means.

10. The apparatus of claim 9, wherein said interface means includes configuration means for selectably configuring the apparatus for connection to two or more distinct types of telecommunication circuits.

11. The apparatus of claim 9, wherein said switch means includes means for suppressing transient voltages that may occur when the load is inductive.

12. An apparatus for operating an electrical circuit in response to a telephone ring signal, comprising:
   a telecommunication interface circuit including:
      a first resistor-capacitor combination for use with a telephone system providing a ring signal having a first voltage level;
      a second resistor-capacitor combination for use with a telephone system providing a ring signal having a second voltage level; and
      a switch for selecting between the first combination and the second combination;
   a ring detection circuit having:
      a rectifier circuit having two input nodes and two output nodes;
      a detector capacitor connected between the output nodes of the rectifier circuit;
      a detector resistor connected in parallel to the detector capacitor; and
      a variable resistor connected to an output node of the rectifier circuit;
   an isolation circuit comprising an optical isolator; and
   an output circuit including:
      a power input terminal;
      a power output terminal;
      a triac connected between the power input terminal and the power output terminal; and
      a surge resistor and a surge capacitor connected in series between the power input terminal and the power output terminal;
      wherein the triac has a gate terminal that is connected to the isolation circuit.

13. An apparatus for operating an electrical load in response to a telephone ring signal, comprising:
   a telecommunication interface circuit;
   a ring detection circuit;
   an isolation circuit comprising an optical isolator; and
   an output circuit coupled to said optical isolator, said output circuit comprising an input terminal, an output terminal, and a triac connected between the input terminal and the output terminal, said triac having a gate terminal connected to an output of the isolation circuit.

14. The apparatus of claim 13, wherein said telecommunication interface circuit comprises:
   a first resistor-capacitor combination for use in a telephone system providing a ring signal having a first voltage level;
   a second resistor-capacitor combination for use in a telephone system providing a ring signal having a second voltage level; and
   a switch for selecting between the first resistor-capacitor combination and the second resistor-capacitor combination depending on the voltage level of the ring signal.

15. The apparatus of claim 13, wherein the telecommunication interface circuit comprises a surge protector.

16. The apparatus of claim 13, wherein the ring detection circuit comprises:
   a rectifier circuit having two input nodes and two output nodes;
   a detector capacitor connected to the output nodes of the rectifier circuit; and
   a detector resistor connected in parallel to the detector capacitor.

17. The apparatus of claim 13, further comprising a variable resistor connected to an output node of the rectifier circuit and to the isolation circuit.

* * * * *